Patented Nov. 15, 1938

2,137,007

UNITED STATES PATENT OFFICE 2,137,007

DISSOLVING, SOFTENING, GELATINIZING AND SWELLING AGENTS

Walther Schrauth, Berlin-Dahlem, and Kurt Stickdorn, Rosslau, Anhalt, Germany, assignors to Deutsche Hydrierwerke Aktiengesellschaft, Berlin-Charlottenburg, Germany, a corporation of Germany No Drawing. Application March 30, 1935, Serial No. 13,993. In Germany March 31, 1934

5 Claims. (Cl. 106—40)

It has been found, that the esters of higher molecular poly-valent, unsaturated, aliphatic alcohols and organic or inorganic acids proved to be excellent dissolving, softening, gelatinizing and swelling agents. Those esters have a remarkable dissolving and gelatinizing power for cellulose derivatives and particularly for nitrocellulose, but they are also able of dissolving other stuffs such as resins, caoutchouc, asphaltums, dyestuffs, oils, greases etc., so that by means of said esters it is possible with many different compounds to bring them jointly into solution or, respectively, to work them together with other stuffs such as cellulose derivatives, into very good lacquers, films or plastic masses. For the making of artificial masses e. g. with artificial resins, or for the vulcanizing of caoutchouc one may advantageously employ the ester of the unsaturated, polyvalent, aliphatic alcohols, especially because they allow the co-employing of other stuffs and thus the improvement of the properties of the finished products.

As dissolving, gelatinizing and softening agents of the kind there are to be considered: the esters of organic carbon acids such as formic acid, acetic acid, butyric acid, lactic acid, lauric acid, ricinoleic acid, abietic acid, naphthenic acid, benzoic acid, salicylic acid, anthranilic acid and others, or likewise of poly-basic acids of an aliphatic, cycloaliphatic or aromatic character such as succinic acid, tartaric acid, adipic acid, sebacic acid, citric acid, cyclo-hexane-diacetic acid, phthalic acid, hydrophthalic acid and others. Among the inorganic esters those of phosphoric acid, sulfuric acid and boric acid have proved to be suitable.

Unsaturated alcohols of the aliphatic series of a higher molecular weight and several hydroxyl groups are particularly the ricinoleyl alcohol and the grape-seed oil alcohol obtainable by the well-known reduction of castor oil or grape-seed oil respectively, especially when aged. But for the same purposes also the poly-valent, unsaturated, higher molecular, aliphatic alcohols are to be considered and obtainable by hydrating linseed oil alcohol or unsaturated hydrocarbon stuffs respectively such as squalene.

Example 1

By dissolving 500 g. of nitrocellulose together with 100 g. of an artificial resin as sold in the trade and 300 g. of di-acetate of the ricinoleyl alcohol in a mixture of 500 g. of acetone, 400 g. of butanol, 1000 g. of butylacetate, one obtains, after diluting, a well-spreading lacquer, which after drying gives a clear and elastic film.

The di-acetate of the ricinoleyl alcohol has an excellent dissolving power for nitrocellulose, caoutchouc (Hevea crepe) artificial resin, oils, fats, waxes etc., which allows the making of a great number of mixtures fit for any purpose.

Example 2

For the manufacture of a leather-varnish 250 g. of nitrocellulose are dissolved, with an addition of 175 g. of castor oil and 75 g. of di-lactate of the ricinoleyl alcohol, in a mixture of 150 g. of ethyl alcohol, 500 g. of cyclohexanone and 500 g. of butylacetate, and the whole is then mixed with 500 g. of toluol.

Example 3

300 g. of benzylcellulose mixed with 100 g. of di-benzoate of the ricinoleyl alcohol, are dissolved in 2000 g. of toluol with an addition of 500 g. of tetra-hydronaphthaline and one obtains thus a lacquer which is most suitable for many different purposes.

Example 4

A covering mass for the manufacture of stencil sheets, spread in the usual way upon a porous or fibrous bearer such as Japan-silk-paper may be obtained according to the following combination:

| | Weight parts of |
|---|---|
| A 7% collodium solution | 45 |
| Di-tartrate of the ricinoleyl alcohol | 13 |
| The esterified product made of hydrated linseed alcohol and acetic acid | 4.5 |
| Benzol | 9 |
| Acetone | 9 |
| Methylalcohol | 10 |
| Bariumsulfate | 13 |

The thus obtained covering mass is spread in the common manner upon the usual silk-paper bearer.

Example 5

A plastic and very fast covering mass is also obtainable in mixing the following components:

| | Weight parts of |
|---|---|
| Gelatine | 20 |
| Water | 60 |
| Salicylic acid | 1 |
| Ammonia 25% | 1 |
| Adipic acid glycerolester | 3 |
| Di-tartrate of the grape-seed alcohol | 5 |
| Red clay | 4 |

The thus obtained high dispersive emulsion is brought upon the usual paper serving as bearer, then it is dried and hardened.

What I claim is:

1. Nitrocellulose containing as softening agent the di-acetic acid ester of the ricinoleyl alcohol.

2. Nitrocellulose containing as softening agent the di-lactic acid ester of the ricinoleyl alcohol.

3. Nitrocellulose containing as softening agent the di-tartaric acid ester of the ricinoleyl alcohol and the esterified product made of hydrated linseed oil alcohol and acetic acid.

4. A plastic material of the character described comprising as a base material a cellulose derivative and as a softening and gelatinizing agent an ester of an alcohol of the group consisting of ricinoleyl alcohol and the unsaturated polyhydric alcohols derived from the unsaturated fatty acids derived from grapeseed oil, linseed oil and squalene with an acid of the group consisting of formic, acetic, butyric, lactic, lauric, ricinoleic, abietic, naphthenic, benzoic, salicyclic, anthranilic, succinic, tartaric, adipic, sebacic, citric, cyclo-hexane-diacetic, phthalic, hydrophthalic, phosphoric, sulfuric and boric acids.

5. A plastic material of the character described comprising as a base material, material of the group consisting of cellulose derivatives, solid resins, caoutchouc and asphalt and as a softening and gelatinizing agent an ester of an alcohol of the group consisting of ricinoleyl alcohol and the unsaturated polyhydric alcohols derived from the unsaturated fatty acids derived from grapeseed oil, linseed oil and squalene with an acid of the group consisting of formic, acetic, butyric, lactic, lauric, ricinoleic, abietic, naphthenic, benzoic, salicyclic, anthranilic, succinic, tartaric, adipic, sebacic, citric, cyclo-hexane-diacetic, phthalic, hydrophthalic, phosphoric, sulfuric and boric acids.

WALTHER SCHRAUTH.
KURT STICKDORN.